Figure 1:
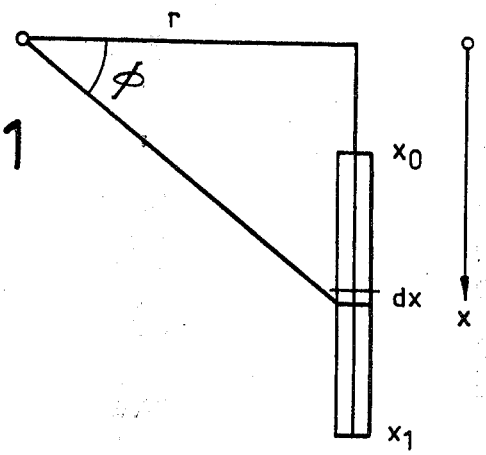
Figure 4:
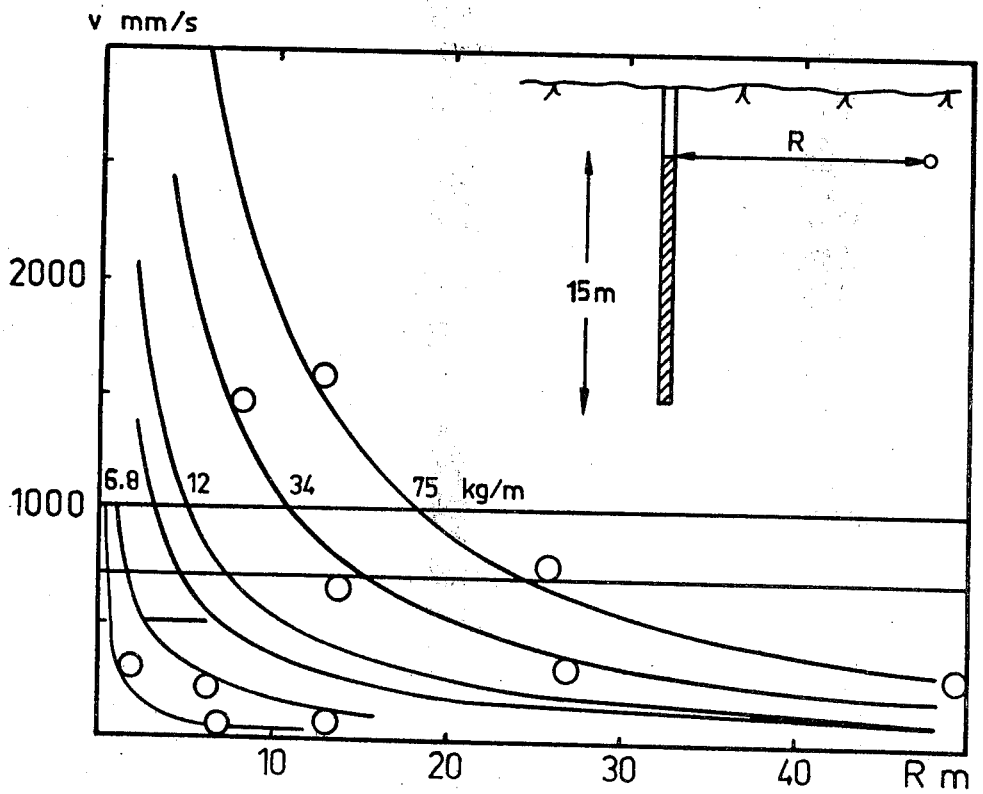
Figure 3:
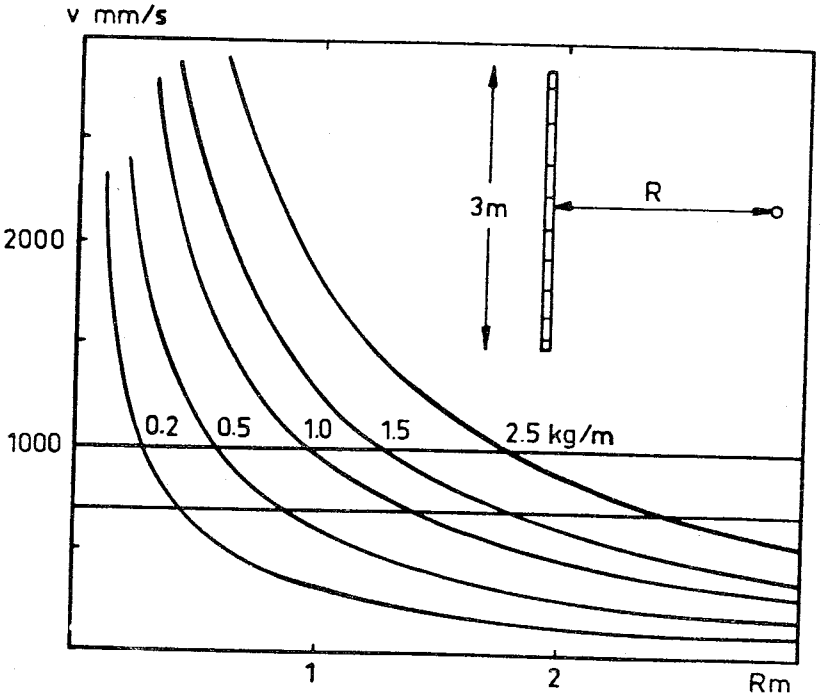
Figure 2:
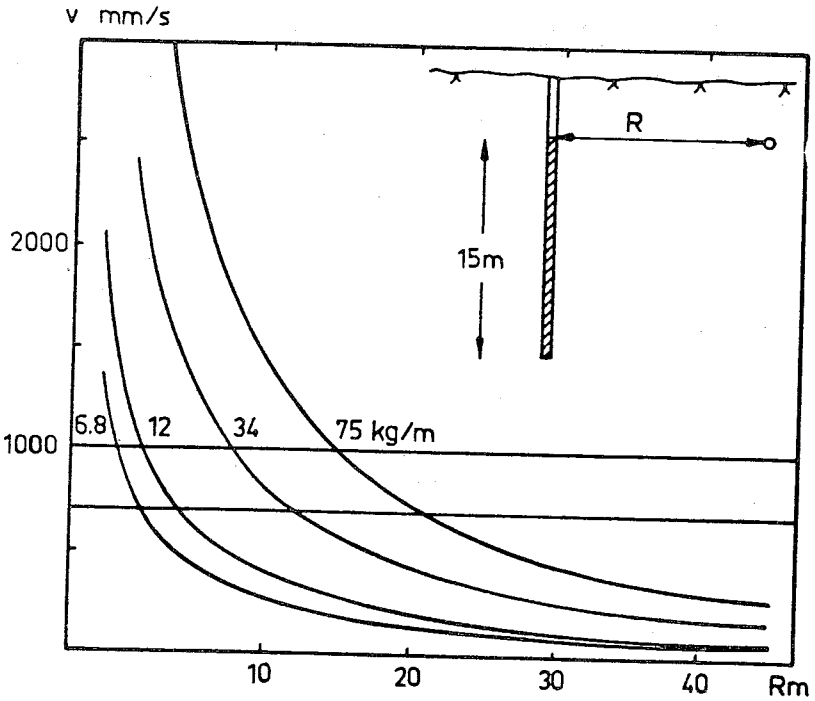
Figure 5:
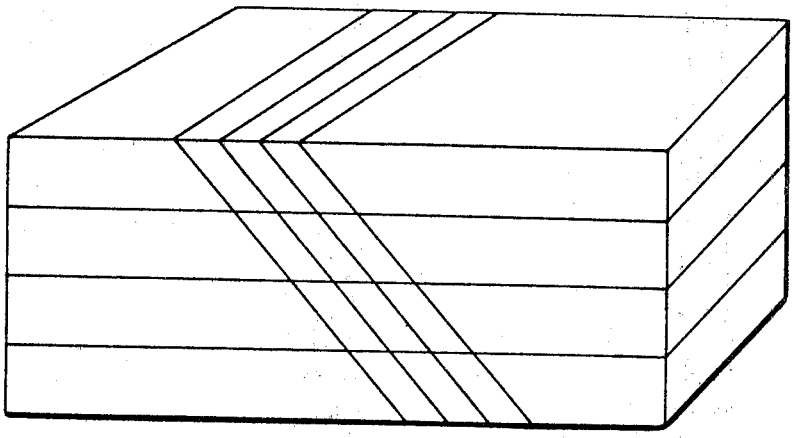
Figure 6:
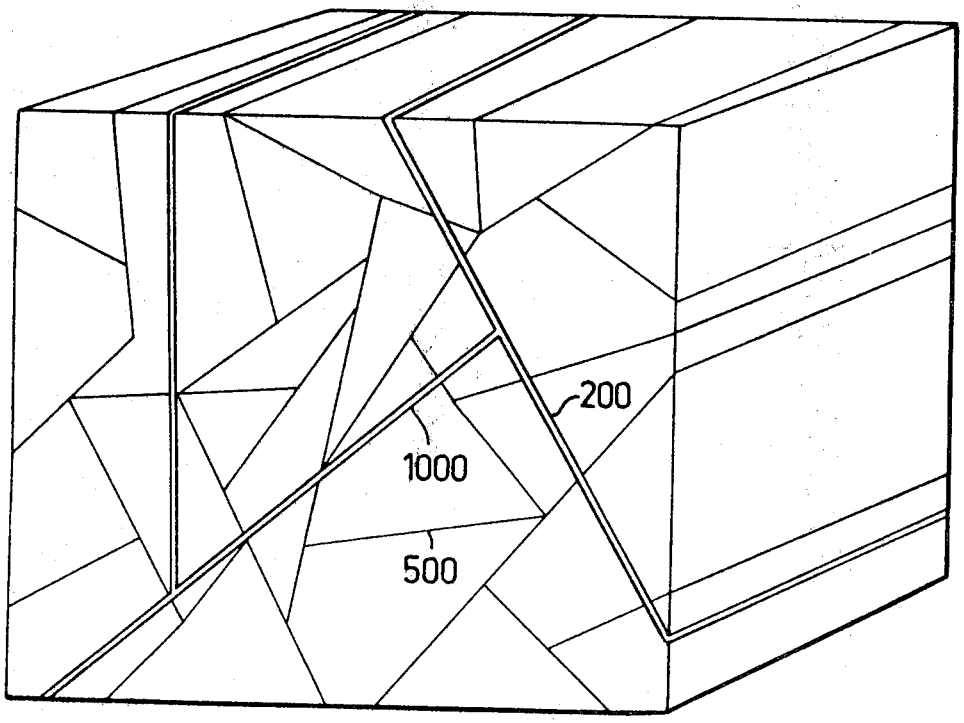
Figure 7A:
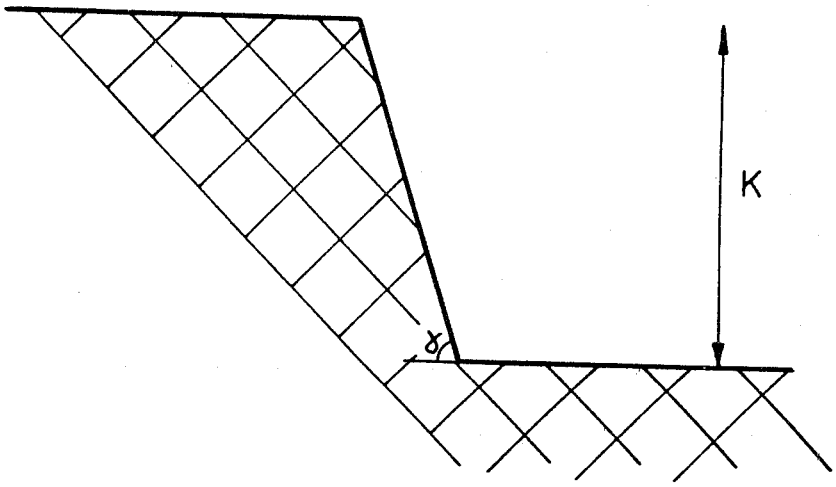
Figure 7B:
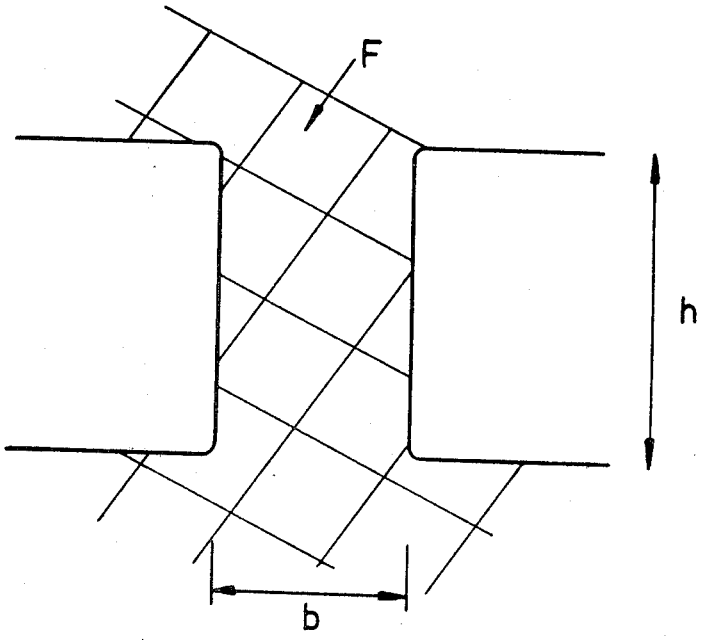
Figure 7C:
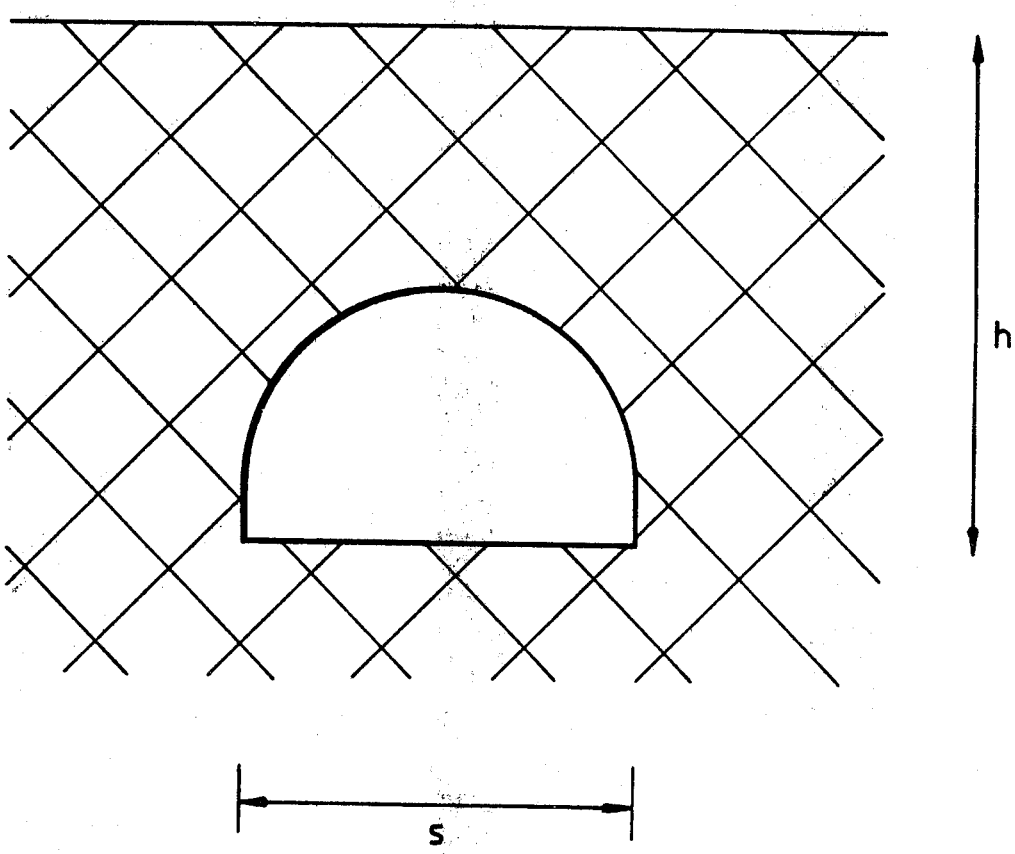

102-308 SR
12/1/81 OR T,101,301

United States Defensive Publication [19] (H) [11] T101,301
Persson et al. [43] Dec. 1, 1981

[54] METHOD FOR BLASTING ROCK

[76] Inventors: Per-Anders Persson, Vinterviken, S-117 48 Stockholm; Roger Holmberg, Eldstigen 23, S-140 41 Sorunda; Gunnar Nord, Love Almqvists väg 84, S-191 44 Sollentuna, all of Sweden

[21] Appl. No.: 154,420

[22] PCT Filed: Dec. 28, 1978

[86] PCT No.: PCT/SE78/00105

§ 371 Date: Sep. 2, 1979

§ 102(e) Date: Dec. 28, 1978

[87] PCT Pub. No.: WO79/00471

PCT Pub. Date: Jul. 26, 1979

[30] Foreign Application Priority Data

Jan. 2, 1978 [SE] Sweden ..... 7800039

[51] Int. Cl.[3] ..... F42B 00/00

[52] U.S. Cl. ..... 102/308

[57] ABSTRACT

Method of blasting rock to attain a predetermined fracture result. The necessary energy for the blasting is provided at an amount and in an application which is decided by calculating the stresses with regard to previously plotted blasting effects and to a previously prepared description of the rock structure.

8 Claims, 5 Sheets Drawing,

12 Pages Specification

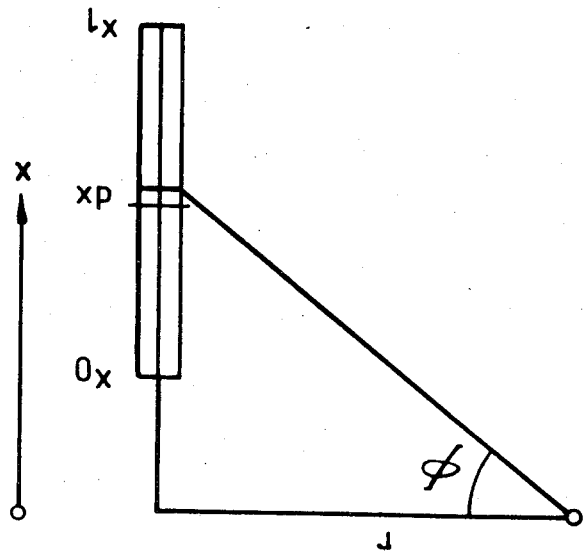

The file of this unexamined application may be inspected and copies thereof may be purchased (849 O.G. 1221, Apr. 9, 1968).